US009866877B2

(12) United States Patent
Shrum, Jr. et al.

(10) Patent No.: US 9,866,877 B2
(45) Date of Patent: Jan. 9, 2018

(54) TRANSPARENT SCALABLE VIDEO CODING

(75) Inventors: Edgar V. Shrum, Jr., Atlanta, GA (US); John Civiletto, Suwanee, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 225 days.

(21) Appl. No.: 13/043,207

(22) Filed: Mar. 8, 2011

(65) Prior Publication Data
US 2012/0230438 A1    Sep. 13, 2012

(51) Int. Cl.
| H04N 7/26 | (2006.01) |
| H04N 7/24 | (2011.01) |
| H04N 21/2343 | (2011.01) |
| H04N 21/2662 | (2011.01) |
| H04N 19/30 | (2014.01) |
| H04N 19/40 | (2014.01) |

(52) U.S. Cl.
CPC ..... H04N 21/234327 (2013.01); H04N 19/30 (2014.11); H04N 19/40 (2014.11); H04N 21/2662 (2013.01)

(58) Field of Classification Search
None
See application file for complete search history.

(56) References Cited

U.S. PATENT DOCUMENTS

| 6,697,422 | B1 | 2/2004 | Mathai |
| 7,770,200 | B2 | 8/2010 | Brooks et al. |
| 7,831,729 | B1 | 11/2010 | Eshet et al. |
| 8,548,056 | B2 * | 10/2013 | Sagetong ............ H04N 19/33 375/240.15 |
| 8,689,275 | B2 * | 4/2014 | Haywood ........ H04N 21/23106 348/193 |
| 8,700,794 | B2 * | 4/2014 | Kim .............. H04N 21/234327 341/106 |
| 2003/0135863 | A1 * | 7/2003 | Van Der Schaar ......................... H04L 29/06027 725/95 |
| 2003/0147462 | A1 | 8/2003 | Maeda |
| 2004/0071216 | A1 * | 4/2004 | Richardson ........ H04L 12/2883 375/240.21 |
| 2005/0041745 | A1 * | 2/2005 | Zhang ................ H04N 19/89 375/240.27 |
| 2005/0246751 | A1 * | 11/2005 | Boyce ............ H04N 21/23439 725/101 |

(Continued)

OTHER PUBLICATIONS

U.S. Patent Application filed Jun. 3, 2010 entitled "Dynamic Content Stream Management," having U.S. Appl. No. 12/792,955.

(Continued)

Primary Examiner — Christopher S Kelley
Assistant Examiner — Kaitlin A Retallick
(74) Attorney, Agent, or Firm — Merchant & Gould

(57) ABSTRACT

Transparent scalable video coding may be provided. Upon receiving a request for a content asset, such as from a subscriber's premises, a quality level associated with the content asset may be identified. A video coding layer and/or a plurality of layers associated with the content asset may be selected according to the identified quality level. The selected video coding layer(s) may be encoded into a video stream and provided to a display device (e.g., a television) associated with the request for the content asset.

20 Claims, 5 Drawing Sheets

(56) References Cited

U.S. PATENT DOCUMENTS

| | | | |
|---|---|---|---|
| 2007/0074266 A1* | 3/2007 | Raveendran | H04N 5/144 725/135 |
| 2007/0143775 A1* | 6/2007 | Savoor | G06Q 30/06 725/1 |
| 2007/0200923 A1* | 8/2007 | Eleftheriadis | H04N 7/152 348/14.08 |
| 2008/0043834 A1 | 2/2008 | Lesser et al. | |
| 2008/0046939 A1 | 2/2008 | Lu et al. | |
| 2008/0165850 A1* | 7/2008 | Sagetong | H04N 19/59 375/240.15 |
| 2008/0281803 A1 | 11/2008 | Gentric | 707/5 |
| 2008/0282301 A1* | 11/2008 | Liu | H04N 7/17318 725/100 |
| 2009/0182789 A1 | 7/2009 | Sandorfi et al. | |
| 2009/0185619 A1 | 7/2009 | Taleb et al. | 375/240.02 |
| 2010/0260254 A1* | 10/2010 | Kimmich | H04N 21/631 375/240.01 |
| 2010/0262712 A1* | 10/2010 | Kim | H04N 21/234327 709/231 |
| 2010/0312905 A1 | 12/2010 | Sandmann et al. | 709/231 |
| 2011/0022492 A1* | 1/2011 | Karaoguz | G06Q 30/0611 705/26.4 |
| 2011/0126054 A1* | 5/2011 | Hayward | G06F 11/0709 714/37 |
| 2011/0302236 A1 | 12/2011 | Shrum | |
| 2012/0106612 A1* | 5/2012 | Haywood | H04N 19/166 375/227 |
| 2012/0320168 A1* | 12/2012 | Yun | H04N 21/23432 348/51 |

OTHER PUBLICATIONS

Office Action dated Sep. 21, 2012, in co-pending U.S. Appl. No. 12/792,955.
Office Action dated May 1, 2013, in co-pending U.S. Appl. No. 12/792,955.
Office Action dated Dec. 22, 2014, in co-pending U.S. Appl. No. 12/792,955.
Office Action dated Jul. 10, 2015, in co-pending U.S. Appl. No. 12/792,955.
Office Action dated Mar. 24, 2016, in co-pending U.S. Appl. No. 12/792,955.
U.S. Appl. No. 12/792,955, Office Action dated Nov. 10, 2016, 24 pages.
U.S. Appl. No. 12/792,955, Notice of Allowance dated Feb. 23, 2017. 9 pages.

* cited by examiner

TRANSPARENT SCALABLE VIDEO CODING

RELATED APPLICATIONS

Related U.S. patent application Ser. No. 12/792,955, filed on Jun. 3, 2010 and entitled "Dynamic Content Stream Management," assigned to the assignee of the present application, is hereby incorporated by reference.

BACKGROUND

Transparent scalable video coding is a process for leveraging scalable video coding (SVC) to deliver content. In some situations, subscriber premises networks (e.g., wireless networks) may be unreliable. Conventional systems may use adaptive bit rate (ABR) technology to select an optimal encoding profile to be unicast to the client subscriber. This may create problems because the unicast of video streaming becomes inefficient as the number of streams scales upward. Furthermore, maintaining an encoding profile for each individual subscriber on a cable system may create a tremendous amount of overhead.

Scalable Video Coding (SVC) is an extension, Annex G, of the H.264/MPEG-4 AVC video compression standard. The SVC standard enables the encoding of a high-quality video bitstream that contains one or more subset bitstreams that can themselves be decoded with a complexity and reconstruction quality similar to that achieved using the existing H.264/MPEG-4 AVC design with the same quantity of data as in the subset bitstream. The subset bitstream is derived by dropping packets from the larger bitstream. A subset bitstream can represent a lower spatial or temporal resolution or a lower quality video signal (each separately or in combination) compared to the bitstream it is derived from. This allows a number of advantages such as temporal (frame rate) scalability, spatial (picture size) scalability, and signal-to-noise ratio (SNR)/quality/fidelity scalability.

SUMMARY

Consistent with embodiments of the present invention, systems and methods are disclosed for side loading. Transparent scalable video coding may be provided. Upon receiving a request for a content asset, such as from a subscriber's premises, a quality level associated with the content asset may be identified. A video coding layer and/or a plurality of layers associated with the content asset may be selected according to the identified quality level. The selected video coding layer(s) may be encoded into a video stream and provided to a display device (e.g., a television) associated with the request for the content asset.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

Figure 1:
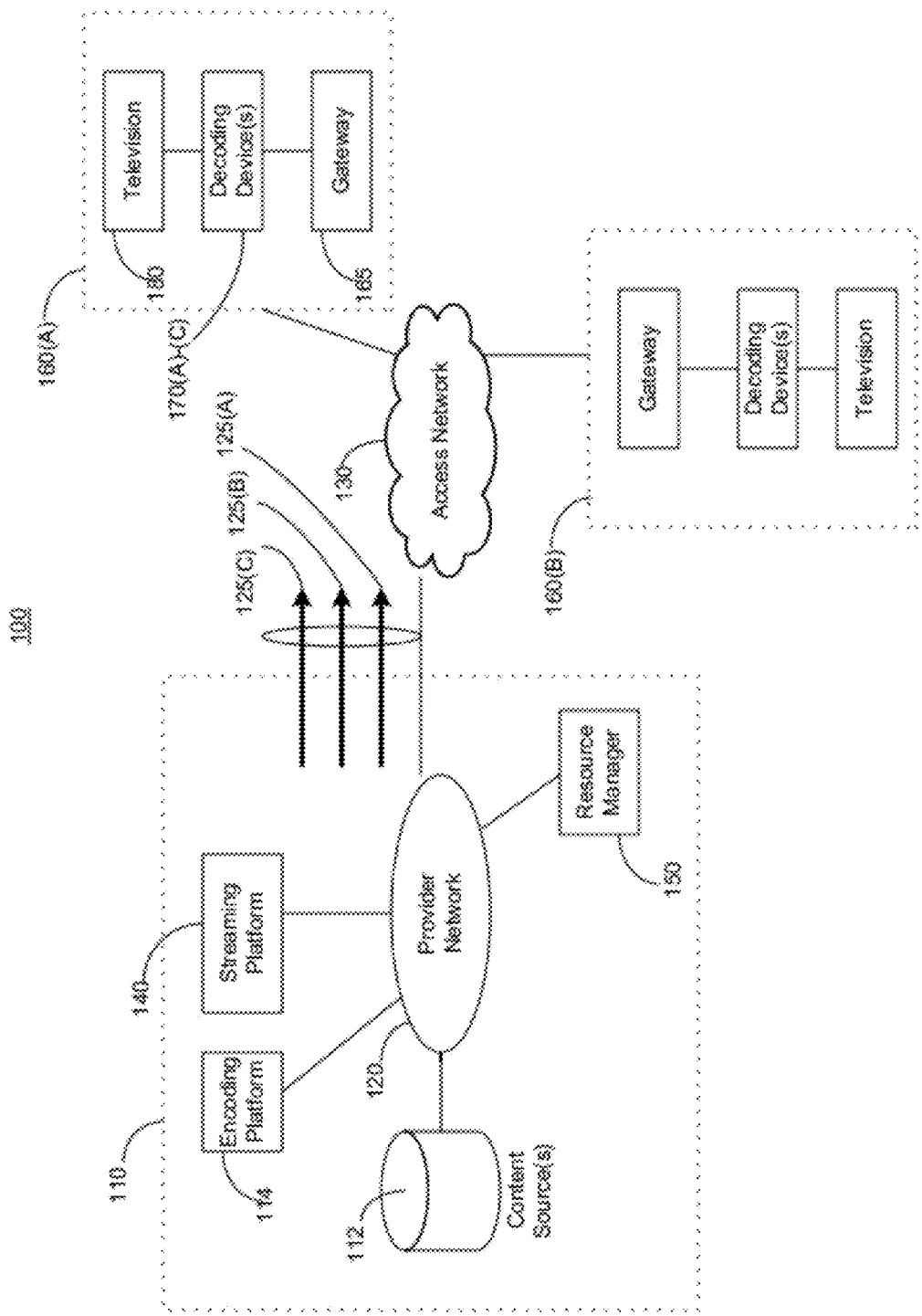
FIG. 1 is a block diagram illustrating a service architecture.

As briefly described above, embodiments of the present invention provide for a method of leveraging scalable video coding (SVC) to deliver content, such as video streams, from a service provider to a subscriber's premises. A gateway located at the subscriber premises and/or shared among a group of subscribers' premises may re-encode SVC video streams and transmit the re-encoded stream to decoding devices (e.g., set-top boxes) located in the subscriber premises.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is simplified block diagram illustrating a service architecture 100 that may comprise an operating environment for a media service provider. Service architecture 100 may comprise a service provider 110 comprising a plurality of content sources 112 and a content encoding platform 114 communicatively coupled via a service provider network 120. Consistent with embodiments of the invention, content encoding platform 114 may be communicatively coupled to other content providers outside of service provider 110 (e.g., third party content providers, not shown) via service provider network 120 and/or a public and/or private network, such as the Internet and/or a virtual private network. Service architecture 100 may further comprise an access network 130, a streaming platform 140 and a resource manager 150. Access network 130 may comprise a private network, such as a cable television distribution network (e.g., a hybrid fiber coax network), a cellular data network, and/or a public network such as a metropolitan WiMAX network and/or the Internet and may communicatively couple service provider 110 with a plurality of subscribers 160(A)-(B).

Content encoding platform 114 may transmit a plurality of SVC layers 125(A)-(C) associated with a video stream to streaming platform 140. Streaming platform 140 may output a single encoded stream as a composite of a selected subset of SVC layers 125(A)-(C). The selection of the SVC layers may be performed based on data and/or heuristic characteristics gathered by and/or stored on resource manger 150 such as network utilization, number of viewers of the video stream, grading of the channel or content asset, time of day, event occurrence, receiving device capabilities, and/or estimated available bandwidth. Consistent with embodiments of the invention, content encoding platform 114, streaming platform 140, and/or resource manager 150 may be configured to execute as applications on a same and/or different computers, such as computing device 500, described below in greater detail with respect to FIG. 5.

Further consistent with embodiments of the invention, streamer platform 140 may stream SVC layers 125(A)-(C) to a plurality of subscriber premises 160(A)-(B) over access network 130. A device located at subscriber premises 160

(A)-(B), such as a gateway 165, may select one and/or more of the SVC layers 125(A)-(C) and may re-encode the selected layers into an output stream that may be provided to a decoding device, such as one of a plurality of decoding device 170(A)-(C). Decoding devices 170(A)-(C) may thus receive the benefit of SVC layer transmission without needing to be compatible with the receipt and decoding of SVC layers 125(A)-(C). Decoding devices 170(A)-(C) may comprise, for example a cable set-top box (STB), a computer such as computing device 500, a tablet, a PDA, a smartphone, and/or a video display application (e.g., QuickTime®, Windows® Media Player, etc.). Each decoding device 170(A)-(C) may be coupled to a display component (e.g., a laptop's screen) and/or an external display device such as a television 180. For example, gateway 165 may output the re-encoded stream comprising the selected set of SVC layers via a standard protocol such as HTTP and/or RTSP.

Figure 2:
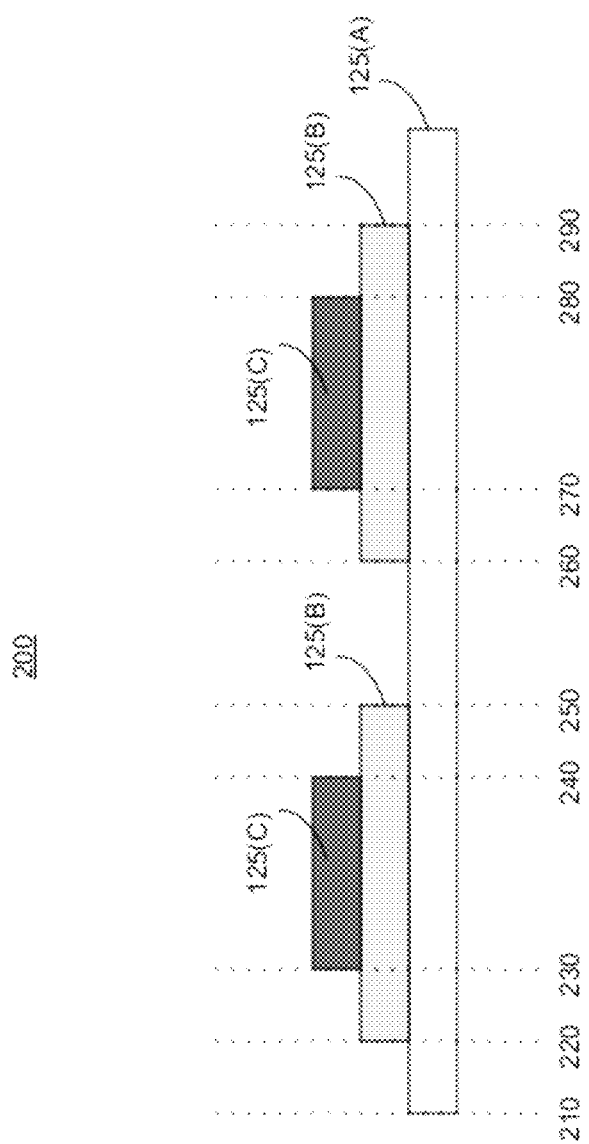
FIG. 2 is a diagram illustrating a composition of SVC layers in an encoded video signal over time.

FIG. 2 is a diagram illustrating a composition of SVC layers in an encoded video signal 200 over time. Consistent with embodiments of the invention, the selected subset of SVC layers 125(A)-(C) may vary over the course of a given content asset stream. As described above, the selection of layers may be performed, for example, by streaming platform 140 and/or gateway 165. Video signal 200 should be considered a non-limiting example case only. For example, a subscriber located at subscriber premises 160(A) may tune to a particular channel. Streaming platform 140 may, at an initial time 210, encode into video signal 200 only a base level (i.e., SVC layer 125(A)) for transmission until heuristic characteristic is received from resource manager 150.

Upon receiving a heuristic characteristic indicating that additional SVC data may be supported at a second time 220, streaming platform 140 may begin encoding a first enhanced level (i.e., SVC layer 125(B)) with the base level into video signal 200 for provision to subscriber premises 160(A). The heuristic characteristic may comprise, for example, a bandwidth estimate indicating that the subscriber's home network has the capacity to transmit a higher bit rate encoding of the requested content. Resource manager 150 may continue to evaluate the heuristic characteristic and may, at third time 230, for example, provide updated statistics to streaming platform 140 indicating that customer premises 160(A) still has available bandwidth. Streaming platform 140 may then begin encoding a second enhanced level (i.e., SVC layer 125(C)) into video signal 200.

At a fourth time 240, resource manager 150 may determine that sufficient bandwidth is no longer available to include the second enhanced level in video signal 200, and that level (i.e., SVC layer 125(C)) may be removed from being encoded into video signal 200. At a fifth time 250, resource manager 150 may determine that the available bandwidth still is insufficient to carry video signal 200 without disruption, and the first enhanced lever (i.e., SVC layer 125(B)) may also be removed by streaming platform 140.

A sixth time 260 may represent a time of day at which the selected content may be considered to be higher priority. For example, subscriber premises 160(A) may be receiving a local broadcast station as video signal 200. At 6:00 PM, a local news program may begin and may be associated with a higher priority for transmission. Resource manager 150 may direct streaming platform 140 to include first enhanced level (i.e., SVC layer 125(B)) in video signal 200 due to the higher priority. At a seventh time 270, an event occurrence (e.g., a severe weather warning) may result in local news receiving a priority upgrade, and so resource manager 150 may direct streaming platform 140 to include the second enhanced level (i.e., SVC layer 125(C)) in video signal 200. Later events, such as a cancellation of the severe weather warning at an eighth time 280 and/or an ending time of the local news program at a ninth time 290 may result in the second enhanced level and first enhanced level, respectively, being removed from video signal 200. Consistent with embodiments of the invention, streaming server 140 may transmit SVC layers 125(A)-(C) according to the direction from resource manager 150 as described above and gateway 165 may select levels to be encoded for subscriber premises 160 according to local heuristics, such as available local premises network bandwidth availability.

Figure 3:
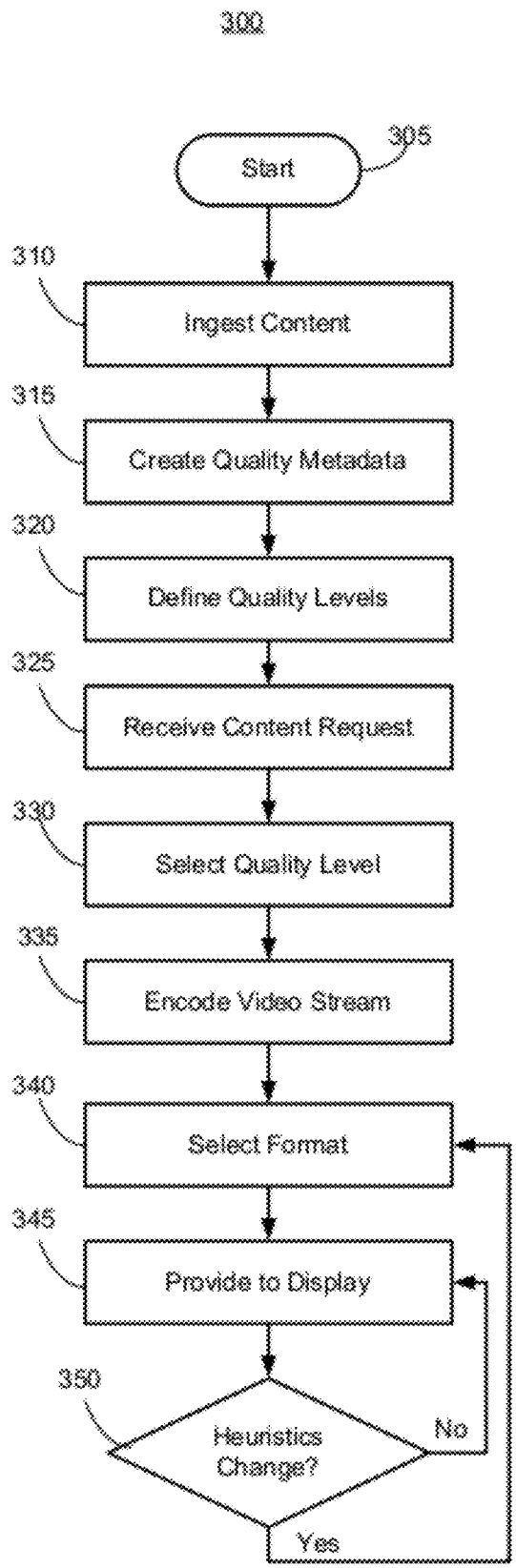
FIG. 3 is a flow chart showing an illustrative routine for providing transparent scalable video coding.

FIG. 3 is a flow chart setting forth the general stages involved in a method 300 consistent with an embodiment of the invention for providing transparent scalable video coding (SVC). Method 300 may be implemented using computing device 500 as described in more detail below with respect to FIG. 5. Ways to implement the stages of method 300 will be described in greater detail below. Method 300 may begin at starting block 305 and proceed to stage 310 where computing device 500 may ingest a content asset. For example, encoding platform 114 may download a television program from one of content sources 112.

From stage 310, method 300 may advance to stage 315 where computing device 500 may convert the content asset into a plurality of formats. For example, encoding platform 114 may receive the content asset in an H.264 encoding format and transcode that asset into other formats such as MPEG-1, MPEG-2, H.263, H.261, etc. The various formats may each be suitable for different display devices; for example, a content asset encoded according to the MPEG-4 Part 2 format may be suitable for display on a smaller display, such as that associated with a smart phone or similar portable device while an asset encoded according to the H.264 standard may be suitable for display on a high definition television.

From stage 315, method 300 may advance to stage 320 where computing device 500 may create alignment and/or quality metadata for each of the various formats. For example, time points may be determined in each encoded format at which the format being transmitted may be changed. The alignment points may comprise, for example, corresponding I-frames in MPEG-2 and MPEG-4 versions of the same content asset. Encoding platform 114 may also be operative to encode metadata comprising a list of quality levels and/or formats available for the content.

From stage 320, method 300 may advance to stage 325 where computing device 500 may define a quality level and/or a plurality of quality levels for each of the formats of the content asset. The quality levels may be associated with heuristic characteristics associated with the content asset. For example, a high quality level may be associated with a content asset that is highly graded, such as an evening news program expected to be requested by a large number of viewers. Each quality level may define associated SVC layers associated with encoding the content asset for that quality level. For example, a low quality level may comprise just a base level (i.e., SVC layer 125(A)). A medium quality level may comprise the base level and a first enhanced level (i.e., SVC layers 125(A)-(B)). A high quality level may comprise the base level, the first enhanced level, and the second enhanced level (i.e., SVC layers 125(A)-(C)).

From stage 325, method 300 may advance to stage 330 where computing device 500 may receive a content asset request. For example, a subscriber at subscriber premises 160(A) may tune to a particular channel (e.g., CNN) on a set-top box (e.g., decoding device 170). The set-top box may transmit the content request over access network 130, directly and/or via gateway 165, to service provider 110. Consistent with embodiments of the invention, the content request may comprise one and/or more heuristic characteristics such as format compatibilities of decoding device 170, available bandwidth over an on premises network at subscriber premises 160(A) (e.g., a home wireless and/or coaxial network), and/or a maximum resolution of a display device associated with the set-top box.

From stage 330, method 300 may advance to stage 335 where computing device 500 may select a quality level for providing the requested content asset. For example, encoding platform 114 and/or streaming platform 140 may receive the content request. Heuristic characteristics, such as those that may be received in association with the content request and/or provided by resource manager 150 may be used to evaluate which quality level should be selected. For example, the requested content asset may be graded at a normal priority, be associated with a large number of requesting subscribers, and an available bandwidth of access network 130, as measured by resource manager 150, may be high. The selected quality level may therefore be "high", associated with multiple enhanced SVC layers in addition to the base layer.

From stage 335, method 300 may advance to stage 340 where computing device 500 may encode the content asset according to the selected quality level. For example, streaming platform 140 may encode the selected SVC layers of the requested content into a video stream. In the example of the "high" quality level selection described above with respect to stage 225, this may comprise encoding SVC layers 125(A)-(C) in one of the available content asset formats (e.g., H.264).

From stage 340, method 300 may advance to stage 345 where computing device 500 may provide the encoded video stream to a display device. For example, the encoded video stream may be unicast to decoding device 170(A) at subscriber premises 160(A) from streaming platform 140 over access network 130. Decoding device 170(A) may receive the encoded video stream, decode the stream, and output it to, for example, television 180.

Consistent with embodiments of the invention, streaming platform 140 may, at stage 340, be operative to multicast SVC layers 125(A)-(C) over access network 130 and make SVC layers 125(A)-(C) available to plurality of subscriber premises 170(A)-(B). These available quality levels may be listed in the quality metadata generated at stage 320 described above. Gateway 165 may then select layers for encoding into a video stream according to heuristic characteristics associated with subscriber premises 160(A) and provide the encoded video stream to decoding device 170 (A). A similar gateway at subscriber premises 160(B) may, for the same content asset, select different layers from those selected by gateway 165 for encoding and providing to a respective decoding device at subscriber premises 160(B). Further, heuristics provided as part of the content request may result in encoding platform 114 selecting a first quality level to provide to subscriber premises 160(A) while later changes within subscriber premises 160(A) may cause gateway 165 to begin re-encoding the content stream at a different quality level. For example, content may initially be encoded for subscriber premises 160(A) at a "medium" quality level, but increased wireless bandwidth within subscriber premises 160(A) may result in the gateway re-encoding the content stream with an additional enhancement level (e.g., second enhancement level 125(C)) in order to provide a higher quality content stream.

From stage 345, method 300 may advance to stage 350 where computing device 500 may determine whether or not to change the quality level. For example, an event such as a tornado warning may occur that raises the grading of a weather program's content asset. Streaming platform 140 may use this event occurrence as a heuristic characteristic for determining whether or not to increase the quality level (i.e., include an additional SVC layer) of the content asset's video stream being encoded and provided to access network 130. Consistent with embodiments of the invention, resource manager 150 and/or gateway 165 may make periodic measurements of network characteristics, such as available bandwidth. These periodic measurements may comprise heuristic characteristics that may be evaluated in determining whether to change the quality level of the encoded video stream. For example, a measured drop in bandwidth may result in decreasing the quality level while a measured increase in the number of viewers of a particular asset may result in an increase of the quality level supplied to access network 130. Consistent with embodiments of the invention, the change in heuristics may be measured, detected, and/or evaluated by encoding platform 114, streaming platform 140, resource manager 150, and/or gateway 165. Thus, both provider and subscriber elements may be present and reacting on different heuristics. For example, service provider 110 may focus on conditions across multiple subscribers associated with access network 130 while gateway 165 may focus on conditions associated with subscriber premises 160(A).

If the quality level is determined not to change at stage 350, method 300 may return to stage 345 where computing device 500 may continue providing the video stream to the decoding device. Otherwise, if the quality level is changed at stage 350, method 300 may return to stage 335 where computing device 500 may select a new quality level according to the heuristic characteristic(s). Method 300 may end after the content asset has completed and/or may restart if the subscriber selects a new content asset.

Figure 4:
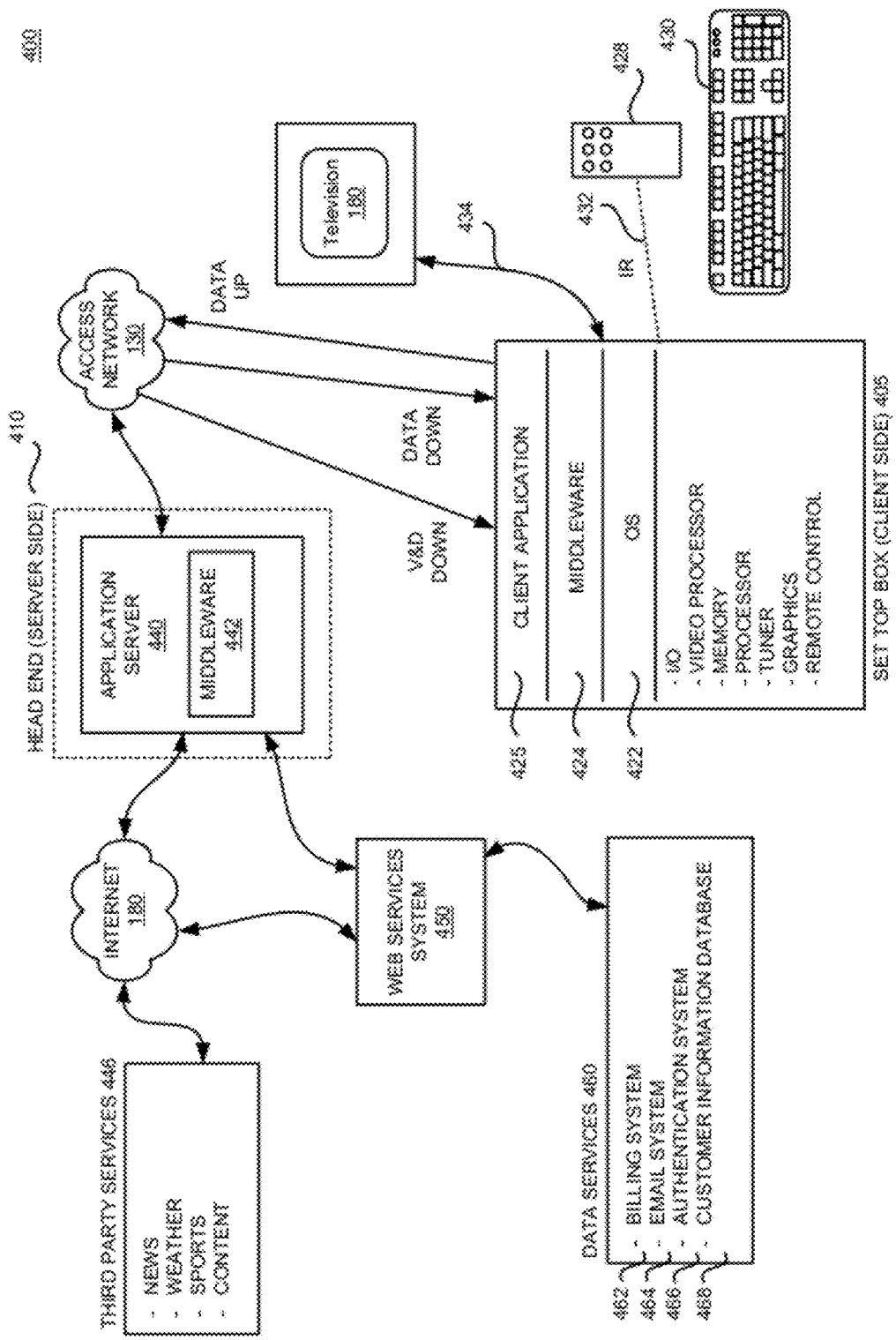
FIG. 4 is a block diagram of a cable services system architecture.

Referring now to FIG. 4, digital and analog video programming, information content and interactive television services may be provided via a hybrid fiber coax (HFC) network such as access network 130 to television 180 for consumption by a cable television/services system customer. As is known to those skilled in the art, HFC networks combine both optical fiber and coaxial cable lines. Typically, optical fiber runs from a cable head end 410 associated with service provider 110 to neighborhoods of 500 to 2,000 customers (each of which may comprise a subscriber premises such as subscriber premises 160(A)-(B)). Coaxial cable may run from the optical fiber feeders to each customer. According to embodiments of the present invention, the functionality of the HFC network allows for efficient bidirectional data flow between a client-side set-top box (e.g., decoding device and the server-side application server 440 of the present invention.

According to embodiments of the present invention, the CATV system 400 is in the form of a distributed client-server computing system for providing video and data flow across access network 130 between server-side services providers (e.g., cable television/service provider 110) via a server-side head end 410 and a client-side customer via a client-side set-top box (STB) 405 (e.g., decoding device 170(A)) functionally connected to a customer receiving device, such as television 180. As is understood by those skilled in the art, modern CATV systems 400 may provide a variety of services across access network 130 including traditional digital and analog video programming, telephone services, high speed Internet access, video-on-demand, and information services.

On the client side of the CATV system 400, digital and analog video programming and digital and analog data are provided to the customer television 180 via the set-top box (STB) 405. Interactive television services that allow a customer to input data to the CATV system 400 likewise are provided by the STB 405. As illustrated in FIG. 4, the STB 405 is a multipurpose computing device having a computer processor, memory and an input/output mechanism. The input/output mechanism receives input from server-side processes via access network 130 and from customers via input devices such as a remote control device 428 and a keyboard 430. The remote control device 428 and the keyboard 430 may communicate with the STB 405 via a suitable communication transport such as the infrared connection 432. The STB 405 also includes a video processor for processing and providing digital and analog video signaling to the television 180 via a cable communication transport 434. A multi-channel tuner is provided for processing video and data to and from the STB 405 and the server-side head end system 410, described below.

The STB 405 also includes an operating system 422 for directing the functions of the STB 405 in conjunction with a variety of client applications 426. For example, if a client application 425 requires a news flash from a third-party news source to be displayed on the television 180, the operating system 422 may cause the graphics functionality and video processor of the STB 405, for example, to output the news flash to the television 180 at the direction of the client application 426 responsible for displaying news items.

Because a variety of different operating systems 422 may be utilized by a variety of different brands and types of set-top boxes, a middleware layer 424 is provided to allow a given software application to be executed by a variety of different operating systems. According to an embodiment of the present invention, the middleware layer 424 may include a set of application programming interfaces (API) that are exposed to client applications 426 and operating systems 422 that allow the client applications to communicate with the operating systems through common data calls understood via the API set. As described below, a corresponding middleware layer is included on the server side of the CATV system 400 for facilitating communication between the server-side application server and the client-side STB 405. According to one embodiment of the present invention, the middleware layer 442 of the server-side application server and the middleware layer 424 of the client-side STB 405 format data passed between the client side and server side according to the Extensible Markup Language (XML).

The set-top box 405 passes digital and analog video and data signaling to the television 180 via a one-way communication transport 434. The STB 405 may receive video and data from the server side of the CATV system 400 via the access network 130 through a video/data downlink and data via a data downlink. The STB 405 may transmit data from the client side of the CATV system 400 to the server side of the CATV system 400 via the access network 130 via one data uplink. The video/data downlink is an "in band" downlink that allows for digital and analog video and data signaling from the server side of the CATV system 400 through the access network 130 to the set-top box 405 for use by the STB 405 and for distribution to the television 180. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 4, between the access network 130 and the set-top box 405 comprise "out of band" data links. As is understand by those skilled in the art, the "out of band" frequency range generally lies between zero and 54 megahertz. According to embodiments of the present invention, data flow between the client-side set-top box 405 and the server-side application server 440 is typically passed through the "out of band" data links. Alternatively, an "in band" data carousel may be positioned in an "in band" channel into which a data feed may be processed from the server-side application server 440 through the access network 130 to the client-side STB 405. Operation of data transport between components of the CATV system 400, described with reference to FIG. 4, is well known to those skilled in the art.

According to one embodiment data passed between the CATV system backend components such as the head end 410 and the CATV system front end components such as the STB 405 may be passed according to the Data Over Cable Service Interface Specification (DOCSIS). As is well known to those skilled in the art, DOCSIS provides for a mechanism for data transport over a cable system such as the CATV 400, illustrated in FIG. 4. Among other things, DOCSIS allows for the passing of digital communications and Internet connectivity over an access network 130.

Referring still to FIG. 4, the head end 410 of the CATV system 400 is positioned on the server side of the CATV system and includes hardware and software systems responsible for originating and managing content for distributing through the access network 130 to client-side STBs 405 for presentation to customers via televisions 180. As described above, a number of services may be provided by the CATV system 400, including digital and analog video programming, interactive television services, telephone services, video-on-demand services, targeted advertising, and provision of information content.

The application server 440 is a general-purpose computing system operative to assemble and manage data sent to and received from the client-side set-top box 405 via the access network 130. As described above with reference to the set-top box 405, the application server 440 includes a middleware layer 442 for processing and preparing data from the head end of the CATV system 400 for receipt and use by the client-side set-top box 405. For example, the application server 440 via the middleware layer 442 may obtain data from third-party services 446 via the Internet 440 for transmitting to a customer through the access network 130 and the set-top box 405. For example, a weather report from a third-party weather service may be downloaded by the application server via the Internet 444. When the application server 440 receives the downloaded weather report, the middleware layer 442 may be utilized to format the weather report for receipt and use by the set-top box 405. According to one embodiment of the present invention, data obtained and managed by the middleware layer 442 of the application server 440 is formatted according to the Extensible Markup Language and is passed to the set-top box 405 through the access network 130 where the XML-formatted data may be utilized by a client application 426 in concert with the middleware layer 424, as described above. As should be appreciated by those skilled in the art, a variety of third-party services data, including news data, weather data, sports data and other information content may be obtained by the application server 440 via distributed computing environments such as the Internet 444 for provision to customers via the access network 130 and the set-top box 405.

According to embodiments of the present invention, the application server 440 obtains customer profile data from services provider data services 460 for preparing a customer profile that may be utilized by the set-top box 405 for tailoring certain content provided to the customer. According to an embodiment of the present invention, a customer profile may include communications applications provisioned on networked STBs, as well as, designations of individual STBs in a home, business or facility (e.g., "kitchen STB," "bedroom STB," "office STB," and the like).

As illustrated in FIG. 4, the services provider data services 460 include a number of services operated by the services provider of the CATV system 400 which may include data on a given customer. For example, a billing system 462 may include information such as a customer's name, street address, business identification number, Social Security number, credit history, and information regarding services and products subscribed to by the customer. An electronic mail system 464 may contain information such as electronic mail addresses, high-speed Internet access subscription information and electronic mail usage data. An authentication system 466 may include information such as secure user names and passwords utilized by customers for access to network services. The customer information database 468 may include general information about customers such as place of employment, business address, business telephone number and demographic information such as age, gender, educational level, and the like. As should be understood by those skilled in the art, the disparate data services systems 462, 464, 466, 468 are illustrated as a collection of data services for purposes of example only. The example data services systems comprising the data services 460 may operate as separate data services systems, which communicate with a web services system (described below) along a number of different communication paths and according to a number of different communication protocols.

Referring still to FIG. 4, a web services system 450 is illustrated between the application server 440 and the data services 460. According to embodiments of the present invention, the web services system 450 serves as a collection point for data requested from each of the disparate data services systems comprising the data services 460. When the application server 440 requires customer profile data from one or more of the data services 460 for preparation or update of a customer profile, the application server 440 passes a data query to the web services system 450. The web services system formulates a data query to each of the available data services systems for obtaining any available data for a given customer as identified by a set-top box identification associated with the customer. The web services system 450 serves as an abstraction layer between the various data services systems and the application server 440. That is, the application server 440 is not required to communicate with the disparate data services systems, nor is the application server 440 required to understand the data structures or data types utilized by the disparate data services systems. The web services system 450 is operative to communicate with each of the disparate data services systems for obtaining necessary customer profile data. The customer profile data obtained by the web services system is assembled and is returned to the application server 440 for ultimate processing via the middleware layer 442, as described above.

Figure 5:
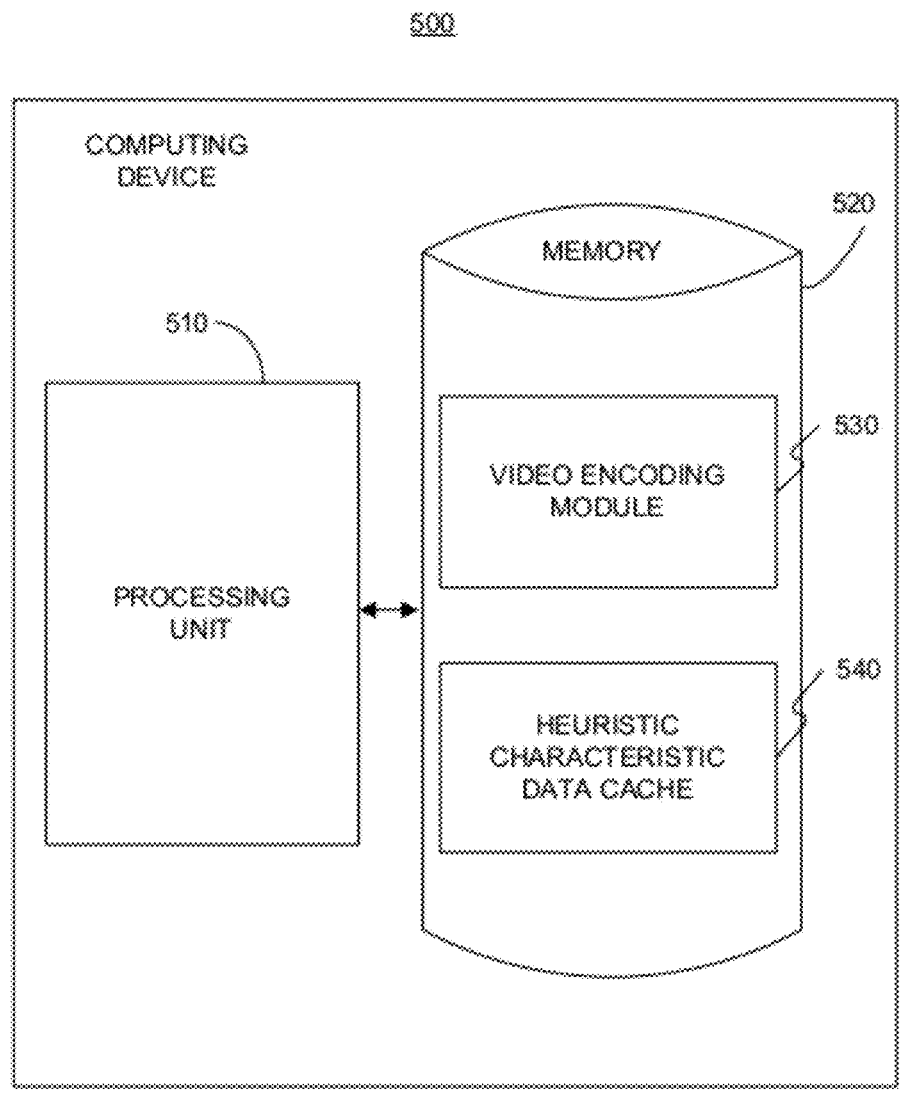
FIG. 5 is a block diagram of a computing device.

FIG. 5 illustrates computing device 500 as configured to execute streaming platform 140. Computing device 500 may include a processing unit 510 and a memory unit 520. Memory 520 may include a video encoding module 530 and a heuristic characteristic data cache 540. While executing on processing unit 510, video encoding module 530 may perform processes for selecting SVC layers according to a quality level and encoding the layers into a video stream comprising, for example, one or more stages included in method 300 described above with respect to FIG. 3. Furthermore, video encoding module 530 may be executed on or reside in any element shown and/or described with respect to FIG. 1, such as gateway 165. Moreover, any one or more of the stages included in method 300 may be performed on any element shown in FIG. 1.

Computing device 500 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

An embodiment consistent with the invention may comprise a system for providing transparent scalable video coding (SVC). The system may comprise a memory storage and a processing unit coupled to the memory storage. The processing unit may be operative to receive a request for a content asset, identify a quality level associated with the content asset, select at least one video coding layer associated with the content asset according to the identified quality level, encode the selected at least one video coding layer into a video stream, and provide the encoded video stream to a display device associated with the request for the content asset. The content asset may comprise, for example, a television program available to subscribers associated with a cable television provider. The video coding layer may comprise one of a plurality of SVC layers comprising a base layer and at least one enhanced layer, wherein the enhanced layer may comprise additional data associated with the content asset. Being operative to identify the quality level may comprise being operative to evaluate at least one heuristic characteristic associated with providing the encoded video stream to the display device, such as a network utilization, a number of viewers of the content asset, a grading of the channel, a grading of the content asset, a time, a date, an event occurrence, a receiving device capability, and/or an estimated available bandwidth.

Another embodiment consistent with the invention may comprise a system for providing transparent scalable video coding (SVC). The system may comprise a memory storage and a processing unit coupled to the memory storage. The processing unit may be operative to ingest a content asset, define a plurality of quality levels associated with the content asset, wherein each of the plurality of quality levels is associated with at least one of a plurality of SVC layers, receive a request for the content asset from a subscriber, select a quality level associated with the content asset according to a characteristic associated with the subscriber, encode the content asset into a video stream according to the selected quality level, and provide the encoded video stream to a display device associated with the subscriber. Being operative to ingest the content asset may comprise being operative to convert the asset into a plurality of formats, wherein each of the plurality of formats comprises a respective plurality of SVC layers and create alignment metadata associated with each of the plurality of formats.

Yet another embodiment consistent with the invention may comprise a system for providing transparent scalable video coding (SVC). The system may comprise a memory storage and a processing unit coupled to the memory storage. The processing unit may be operative to receive a request for a content asset from a subscriber device, wherein the request comprises at least one heuristic characteristic associated with the subscriber device, select a quality level associated with the content asset, wherein the quality level comprises an identification of at least one SVC layer to be encoded and wherein the selection of the quality level is made according to the at least one heuristic characteristic, encode the content asset into a video stream according to the selected quality level, and transmit the encoded video stream to the subscriber device via an access network.

As described herein, methods and systems are provided for allowing a user of a wireless communication device or other suitable communication device to receive and review transcribed voicemail messages in text format and for allowing the user to access associated audio versions of transcribed voicemail messages without the need for accessing a voicemail system to cycle through various prompts and stored voicemail messages. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of providing transparent scalable video coding (SVC), the method comprising:
   receiving a request for a content asset to be displayed on a display device, the request comprising subscriber heuristic characteristics including format compatibilities of a decoding device, an available bandwidth over a subscriber on-premises network, and a maximum resolution of the display device, wherein the content asset is multicast to a plurality of subscriber premises and available qualities levels for the content asset that are based on a quality level of an encoded video stream, comprise at least one SVC layer from the encoded video stream, and are listed in quality metadata;
   determining provider heuristic characteristics by measuring a number of viewers of the content asset and changes in available bandwidth over a provider network to deliver the content asset to the subscriber network;
   identifying a quality level from a plurality of formats specifying the available quality levels for the content asset, wherein the quality metadata enable a gateway device located at each subscriber premises of the plurality of subscriber premises associated with requests for the content asset to select an on-premises quality level for the content asset from the available quality levels, wherein the identified quality level is made according to the subscriber heuristic characteristics and the provider heuristic characteristics;
   selecting at least one video coding layer associated with the content asset according to the identified quality level;
   encoding the content asset according to the identified quality level, including encoding the selected at least one video coding layer in a format associated with the display device into a video stream; and
   providing the encoded video stream to the display device associated with the request for the content asset.

2. The method of claim 1, wherein the content asset comprises one of a plurality of television programs available to subscribers associated with a cable television provider.

3. The method of claim 1, wherein the at least one video coding layer comprises one of a plurality of video coding layers comprising a base layer and at least one enhanced layer.

4. The method of claim 3, wherein the identified quality level is associated with a subset of the plurality of video coding layers and comprises at least the base layer.

5. The method of claim 3, wherein the at least one enhanced layer comprises additional data associated with the content asset.

6. The method of claim 1, wherein the provider heuristic characteristic further comprises at least one of the following: a grading of a channel, a grading of the content asset.

7. The method of claim 1, further comprising:
   identifying a second heuristic characteristic associated with providing the encoded video stream to the display device; and
   determining whether to change the identified quality level associated with the content asset.

8. The method of claim 1, wherein the at least one video coding layer associated with the content asset is selected by a streaming service prior to providing the encoded video stream to an access network for transmission to the display device.

9. The method of claim 1, wherein the at least one video coding layer associated with the content asset is selected by a gateway device located at a premises associated with the request for the content asset.

10. A system for providing transparent scalable video coding (SVC), the system comprising:
    a memory storage; and
    a processing unit coupled to the memory storage, wherein the processing unit is operative to:
    ingest a content asset, wherein the content asset is multicast to a plurality of subscriber premises;
    convert the content asset into a plurality of formats, each format of the plurality of formats being associated with a display device;
    store metadata for each format including alignment points at which the format being transmitted may be changed;
    define a plurality of quality levels associated with each format of the content asset, each quality level being based on at least one heuristic characteristic, wherein each of the plurality of quality levels is associated with at least one of a plurality of SVC layers and are listed in quality metadata, wherein the quality metadata enable a gateway device located at each subscriber premises of the plurality of subscriber premises associated with requests for the content asset to select an on-premises quality level for the content asset from the available quality levels, wherein the available quality levels are based on the quality level of an encoded video stream and comprise at least one SVC layer from the encoded video stream, and wherein each subscriber premises of the plurality of subscriber premises selects its on-premises quality level based on heuristic characteristics associated with that subscriber premises;

receive a request for the content asset from a subscriber to be displayed on the display device, the request comprising subscriber heuristic characteristics including one or more of format compatibilities of a decoding device, an available bandwidth over a subscriber on-premises network, and a maximum resolution of the display device, wherein the subscriber heuristic characteristics are determined by the decoding device;

determine provider heuristic characteristics at a provider platform, the provider heuristic characteristics indicating a number of viewers of the content asset and a grading of the content asset;

select the quality level associated with the content asset, wherein the quality level comprises an identification of at least one SVC layer to be encoded and wherein the selection of the quality level is made according to the provider heuristic characteristics and the subscriber heuristic characteristics;

encode the content asset into a video stream according to the quality level and the format associated with the display device; and provide the encoded video stream to the display device associated with the subscriber.

11. The system of claim 10, wherein being operative to provide the encoded video stream to the display device associated with the subscriber comprises being operative to transmit the encoded video stream from the system to an access network for transmission to the display device.

12. The system of claim 10, wherein being operative to provide the encoded video stream to the display device associated with the subscriber comprises being operative to transmit the plurality of SVC layers from the system to an access network for transmission to a gateway device coupled to the display device and operative to encode the content asset into the video stream according to the quality level.

13. The system of claim 10, wherein being operative to ingest the content asset comprises being operative to:
create alignment metadata associated with each of the plurality of formats.

14. A memory storage which stores a set of instructions which when executed performs a method for providing transparent scalable video coding (SVC), the method executed by the set of instructions comprising:

receiving a request for a content asset from a subscriber device, wherein the request comprises a subscriber heuristic characteristic including one or more of format compatibilities of a decoding device, an available bandwidth over a subscriber on-premises network, and maximum resolution associated with the subscriber device;

determining a provider heuristic characteristic by measuring a number of viewers of the content asset and changes in available bandwidth over an access network to deliver the content asset to the subscriber network;

selecting a quality level associated with the content asset, wherein the quality level comprises an identification of at least one SVC layer to be encoded and wherein the selection of the quality level is made according to the subscriber heuristic characteristic and the provider heuristic characteristic;

encoding the content asset into a video stream according to the quality level and a format associated with the subscriber device; and transmitting the encoded video stream to the subscriber device via the access network;

wherein the content asset is multicast to a plurality of subscriber premises;

wherein available qualities levels for the content asset are listed in quality metadata; and wherein the quality metadata enable a gateway device located at each subscriber premises of the plurality of subscriber premises associated with requests for the content asset to select an on-premises quality level for the content asset from the available quality levels, wherein the available quality levels are based on the quality level of the encoded video stream and comprise at least one SVC layer from the encoded video stream, and wherein each subscriber premises of the plurality of subscriber premises selects its on-premises quality level based on heuristic characteristics associated with that subscriber premises.

15. The memory storage of claim 14, wherein the encoded video stream is transmitted to the subscriber device as a unicast video stream addressed to the subscriber device.

16. The memory storage of claim 14, further comprising:
receiving at least one second heuristic characteristic associated with the subscriber device; and
selecting a new quality level comprising at least one different SVC layer associated with the content asset for encoding and transmitting to the subscriber device.

17. The memory storage of claim 16, wherein the at least one second heuristic characteristic is received from a resource manager operative to monitor the access network.

18. The memory storage of claim 16, wherein the at least one second heuristic characteristic is received from the subscriber device.

19. The memory storage of claim 16, further comprising:
adjusting the quality level in response to severe weather events; and
re-encoding the content asset into the video stream according to the adjusted quality level and the format associated with the subscriber device.

20. The memory storage of claim 19, further comprising:
re-adjusting the quality level in response to a cancellation of the severe weather events; and
re-encoding the content asset into the video stream according to the re-adjusted quality level and the format associated with the subscriber device.

* * * * *